United States Patent
Ciulla et al.

(10) Patent No.: US 10,552,468 B2
(45) Date of Patent: Feb. 4, 2020

(54) TOPIC PREDICTIONS BASED ON NATURAL LANGUAGE PROCESSING OF LARGE CORPORA

(71) Applicant: Quid, Inc., San Francisco, CA (US)

(72) Inventors: Fabio Ciulla, San Francisco, CA (US); Ruggero Altair Tacchi, San Francisco, CA (US); Robert Goodson, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 282 days.

(21) Appl. No.: 15/800,852

(22) Filed: Nov. 1, 2017

(65) Prior Publication Data
US 2018/0121539 A1  May 3, 2018

Related U.S. Application Data

(60) Provisional application No. 62/415,989, filed on Nov. 1, 2016.

(51) Int. Cl.
*G06F 16/00* (2019.01)
*G06F 16/35* (2019.01)
*G06F 16/33* (2019.01)

(52) U.S. Cl.
CPC ........ *G06F 16/353* (2019.01); *G06F 16/3344* (2019.01)

(58) Field of Classification Search
CPC ............................ G06F 16/353; G06F 16/3344
USPC ........................................................ 707/738
See application file for complete search history.

(56) References Cited

U.S. PATENT DOCUMENTS

| | | | |
|---|---|---|---|
| 9,836,183 B1* | 12/2017 | Love | G06T 11/206 |
| 2006/0069589 A1* | 3/2006 | Nigam | G06F 17/274 |
| | | | 706/55 |
| 2014/0189000 A1* | 7/2014 | Zhang | H04L 43/045 |
| | | | 709/204 |
| 2015/0154509 A1 | 6/2015 | Lightner et al. | |
| 2015/0317303 A1 | 11/2015 | Zhang et al. | |
| 2016/0110343 A1 | 4/2016 | Kumar | |
| 2016/0203130 A1 | 7/2016 | Roque et al. | |
| 2016/0232226 A1 | 8/2016 | McManis et al. | |
| 2016/0314191 A1 | 10/2016 | Markman et al. | |
| 2016/0335345 A1 | 11/2016 | Wang | |
| 2017/0004129 A1 | 1/2017 | Shalaby et al. | |
| 2017/0116178 A1 | 4/2017 | Kumar | |
| 2017/0262448 A1 | 9/2017 | Paulsen et al. | |
| 2017/0345074 A1* | 11/2017 | Wadley | G06Q 30/0613 |

OTHER PUBLICATIONS

Keane et al., "Using Topic Modeling and Similarity Thresholds to Detect Events", NAACL-HLT 2015, pp. 34-42.*

* cited by examiner

*Primary Examiner* — Monica M Pyo
(74) *Attorney, Agent, or Firm* — Pillsbury Winthrop Shaw Pittman, LLP

(57) ABSTRACT

Provided is a process including obtaining a corpus having a plurality of time-stamped documents; detecting topics in the unstructured natural language text; determining temporal-metrics of the topics based on time-stamps of documents to which the topics pertain; and predicting based on the temporal-metrics, whether a given topic among the plurality of topics will appear in future time-stamped documents.

19 Claims, 4 Drawing Sheets

TOPIC PREDICTIONS BASED ON NATURAL LANGUAGE PROCESSING OF LARGE CORPORA

CROSS-REFERENCE TO RELATED APPLICATIONS

The present patent is a non-provisional of, and thus claims the benefit of, U.S. Provisional Patent Application 62/415,989, titled TOPIC PREDICTIONS BASED ON NATURAL LANGUAGE PROCESSING OF LARGE CORPORA, filed 1 Nov. 2016. The entire content of each afore-listed parent patent filing is hereby incorporated by reference.

BACKGROUND

1. Field

The present disclosure relates generally to graph analysis and, more specifically, to Topic Predictions Based on Natural Language Processing of Large Corpora.

2. Description of the Related Art

Often, it is useful to make predictions about topics likely to arise in the future, e.g., news topics pertaining certain entities, like businesses, politicians, and the like. Often such predictions are informed by bodies of text, like the various corpora described below, such as news articles, blog posts, social media posts, and the like. Existing techniques for making such predictions based on text data (and other data) are lacking, either because they are inaccurate, are expensive, or do not scale well.

SUMMARY

The following is a non-exhaustive listing of some aspects of the present techniques. These and other aspects are described in the following disclosure.

Some aspects include a process of predicting topics pertaining to various entities based on patterns in text and other data sources, the process including: obtaining, with one or more processors, a corpus having a plurality of time-stamped documents having unstructured natural language text; detecting, with one or more processors, topics in the unstructured natural language text and, in response, associating with each of the documents one or more topic scores by which the topics are detected, wherein: detecting topics comprises determining the topic scores; the topic scores are indicative of whether an associated document in the corpus pertains to a topic corresponding to the respective topic score; detecting topics comprises detecting whether the documents pertain to any of a plurality of topics such that a determination is made for each permutation of topic-and-document pair; determining, with one or more processors, temporal-metrics of the topics based on time-stamps of documents to which the topics pertain, wherein: determining temporal-metrics comprises aggregating topic scores over time according to the time-stamps of the documents to form aggregated topic scores; determining temporal-metrics comprises determining a measure of a peak aggregated topic score for at least some of the topics; and determining temporal-metrics comprises determining a measure of persistence for at least some of the topics; predicting, with one or more processors, based on the temporal-metrics, whether a given topic among the plurality of topics will appear in future time-stamped documents having unstructured natural language text; and storing, with one or more processors, a result of the prediction in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
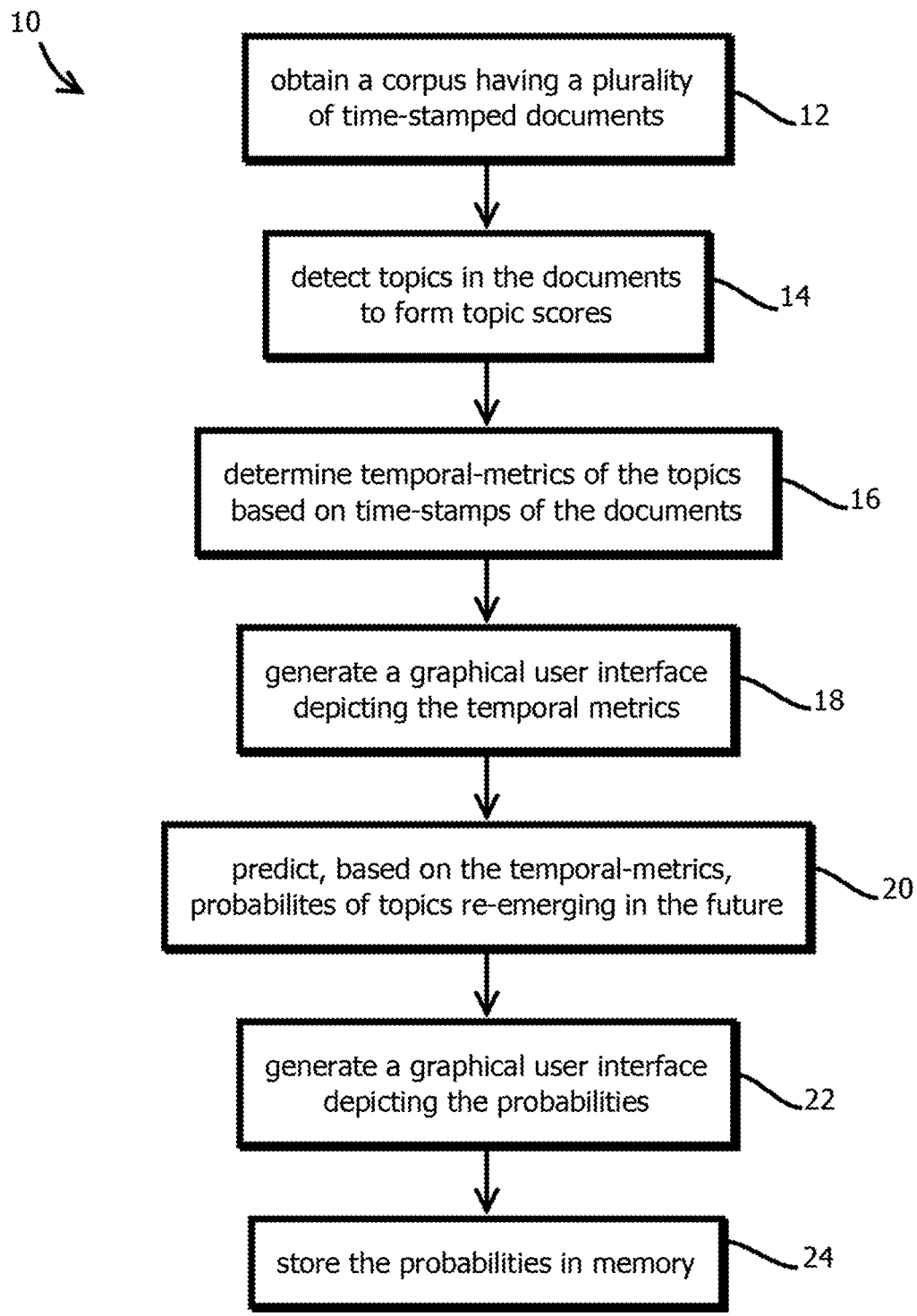
FIG. 1 is a flowchart of an example of a process by which topics are predicted in accordance with some embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science, data science, and natural-language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The architectures described below with reference to FIGS. 1-4 may, in some cases, implement a process to predict topics in one or more streams of documents that unfold in time. The process can be understood with reference to a concrete example below, in passages describing an example use case relating to presidential campaigns. Subsequently, a more generalized discussion is presented. The description of the example use case for the present techniques should not be read as limiting the uses of the present techniques (which is not to imply that any other feature is limiting). The example is described with reference to controversies arising in relation to the presidential election, but the techniques may be used to predict various other topics an in relation to various other entities, among other uses.

Some embodiments may predict controversies about candidates in a presidential campaign. For instance, the task may include predicting which specific controversies will flare up for Candidate A and Candidate B between Sep. 12 and Oct. 12, 2016. Some embodiments make these predictions by using patterns in vast amounts of data to make consistently accurate predictions about what would happen in the future. Some embodiments computationally make predictions that have the highest mathematical possibility of recurrence.

To this end, some embodiments analyze, and generate visualizations of, massive amounts of text data so that organizations can make important strategic decisions. One of the machine's datasets may be news coverage, including millions of news sites and blogs from around the globe. Some embodiments operate upon the news dataset on behalf of corporate clients to forecast risks and opportunities on the horizon pertaining to their business. Some embodiments tracks which topics are gaining traction with the public vs. those that are waning in importance.

In testing, some embodiments analyzed coverage of presidential campaigns, identifying controversies that spiked. In an evaluation, some embodiments ended up cataloguing nearly 100 controversies from the previous year, analyzing in total, some 7.4 million pieces of unique content (e.g., unique documents). Some embodiments generated network visualizations to help a team of humans see how all the controversies tied together, and some embodiments may detect patterns in the visualized data, e.g., by clustering controversies or other topics. Some embodiments may generate a heatmap visualization (where color maps to temporal-metrics) to categorize coverage of each controversy by multiple metrics, like volume of stories.

Some embodiments may reveal and detect recognizable patterns. For example, controversy events or other event issues (e.g., corresponding to spikes or other fluctuations in discussion of the topic) may be characterized by very high volume, high persistence, and an extended time period (or vice versa with respect to any subset or all of these dimensions). In another example, repeat topic events, such as sequel controversies that have peaked in the news more than once but are separated by very low activity, may be revealed (in visualizations or metrics) or detected. For instance, some topic events may go away for a long while and then suddenly reappear.

Some embodiments may create a unique temporal signature for each controversy or other topic based on the presently described metrics. Some embodiments may use these signatures to identify categories based on temporal features in the time series. Some embodiments may train a machine learning algorithm to score and rank (or select among) each controversy (or other topic) according to its likelihood to recur in the future.

After analyzing a controversy's occurrence during the campaign, in testing, some embodiments were able to compute both the probability distribution of its recurrence in the future as well as the onset of brand new controversies. As discussed in the provisional application incorporated by reference, some embodiments may generate visualizations with curves (plotted against number of events and probability) that show the probability distribution for all controversies in, for example, a one-month timeframe. Some embodiments may overlay the straight lines on these curves that show actual values for that month.

With these techniques, some embodiments may generate a ranked (or thresholded) list of topics based on their respective probabilities of appearing in the future. Companies are expected to use these techniques to understand what consumers are saying about their brands, products, and competitors, among other use cases. Companies are also expected use these approaches to get a bird's-eye view of various markets, including its size, growth, and top investments. Or to map emerging technologies or IP landscapes at a glance and quickly digest information about various industries.

Thus, some embodiments make predictions focused on controversies (or other topics) with patterns that were most mathematically likely to recur. Periodically, e.g., at the beginning of the month, some embodiments may generate machine-assisted (or fully automated) predictions. Improved accuracy from these predictions relative to expert human predictions was observed to provide benefits that accumulate in some scenarios. In testing, the long-term statistical considerations started to pay off, and the algorithm of some embodiments was able to capture controversies that overall collected considerably more news volume. For instance, some embodiments were observed to identify a given topic as a high-volume, persistent issue that was likely to recur and, as a result, designate that topic as a top prediction.

The above techniques and other related techniques may be implemented with a process 10 shown in FIG. 1. In some embodiments, this process may be executed in a computational linguistics system described below with reference to FIG. 3, operating upon data like that described below with reference to FIG. 2. In some embodiments, these processes and systems may be implemented with instances of the computer system described below with reference to FIG. 4.

In some embodiments, the process 10, and the other functionality described herein, may be effectuated by executing with one or more processors instructions, such as program code, stored on a tangible, non-transitory, machine-readable medium. In some embodiments, the instructions may be distributed, such that different media store different subsets of the instructions, and different processors execute those different subsets, an arrangement consistent with the singular term "medium" used herein. In some embodiments, instances of the process 10 or subsets of the operations therein may be executed concurrently, for instance in different processes or on different computing devices or other computational entities, like virtual machines, containers, or microkernels. In some embodiments, the steps may be executed serially in the order described or in a different order from that shown in FIG. 1, and in some cases, additional steps may be inserted or some steps may be omitted, none of which is to suggest that any other description herein is limiting.

In some embodiments, the process 10 may be run by the computational linguistics system described below, e.g., responsive to a request from an analyst operating one of the remote client computing devices interfacing with that computational linguistics system. For example, an analyst may request that the process 10 or a subset thereof be run against a corpus identified in the request. In some cases, the request may be received via an application program interface of the commutation linguistics system. In some embodiments, the request may be programmatically generated by another application. In some embodiments, the process 10 may be executed periodically, for example more or less often than hourly, daily, weekly, or monthly, in order to automatically (which is not to suggest that other operations are not automatic) detect and generate alarms or visualizations pertaining to changes in probabilities of various topics appearing in documents in the future, or characterize recently published documents (like documents with less than a threshold age).

In some embodiments, the process 10 may include obtaining a corpus having a plurality of time-stamped documents, as indicated by block 12. The documents may take a variety of different forms, examples including news articles, blog posts, academic journal articles, microblog posts, social media posts, product reviews, restaurant reviews, comments on any of these examples, transcripts of news broadcasts, transcripts of video blog posts, transcripts of podcasts, earnings reports, securities and exchange filings, patent applications, court filings, or various other filings, for instance, either regulatory or newsworthy. In some cases, the documents may be nonpublic documents, such as emails, instant messages, social media posts, or the like within a company.

Each document may have associated therewith a timestamp of when the document was published, modified, or otherwise composed. Timestamps may indicate both a date and time or just a date. In some embodiments, the time stamped documents may emerge over time, with the timestamps indicating when the documents were published, with each document being associated with its own respective timestamp.

In some embodiments, the corpus may span (e.g., include documents from) one or more channels (e.g., a corpus of news articles and blog posts, or any other permutation of the listed examples), each channel corresponding to one of the above-described different forms of documents, and in some cases platforms through which those different forms are published. For instance, there may be multiple social media channels.

The corpus may be relatively voluminous, and of greater size than a human can readily process in relevant time periods (e.g., less than an hour, day, or week). In some embodiments, the obtained corpus may include more than 2000 documents, for instance, more than 5000, more than 10,000, or more than 100,000 documents having an average length of more than 100 characters, for instance more than 10 words, more than 50 words, more than hundred and 50 words, or more than 500 words. In some embodiments, the documents may be obtained by segmenting other, larger documents, for example, into sentences, paragraphs, chapters, or the like. In some embodiments, the documents may be published over some duration of time, for instance, a duration of time greater than one day, one week, one month, or one year. In some embodiments, each of the documents may include natural language unstructured text, such as human readable prose published in the document. In some cases, the documents may be obtained with metadata indicating an author of the document, the timestamp, a channel, a type of the document among the above-listed types, an amount of instances in which the document was viewed, an amount of instances in which the document was shared, an amount of instances in which the document was commented upon, or the like.

The present techniques may be applied to data sets other than natural language text data sets or used in conjunction with data sets of the natural language text data sets. For example, other timeseries data may be combined with time-series temporal-metrics described below to enrich the below-describe predictions, examples including weather, market prices, public health data, and the like. A drop in market prices may be predictive of topics pertaining to company earnings, or hot spell in the weather may be predictive of topics pertaining to crime.

Some embodiments may detect topics in the documents to form topics scores, as indicated by block 14. In some cases, each topic has a respective topic identifier that distinguishes that topic from other topics. Topics may be detected with keyword based approaches, supervised machine learning approaches, or unsupervised machine learning approaches. Examples of each are described below.

In some embodiments, detecting topics may include accessing a data structure stored in memory that maps topics to a respective set of one or more queries. Documents may be determined to pertain to topics based on whether the documents are responsive to queries mapped to those topics. For example, some embodiments may associate each topic identifier with one or more keywords, and some embodiments may determine that a given document pertains to a given topic upon that document being determined to be responsive to a query with the corresponding keyword. In some embodiments, the queries may be expressed as regular expressions, natural language queries, or Boolean queries, for example, including conjunctive or disjunctive operators that relate one or more n-grams, such as the keywords.

Some embodiments may detect topics in the documents concurrently by applying different subsets of the queries to the documents on different computing devices or other above-describe computational entities. Some embodiments may detect topics in the documents concurrently by applying each of the queries to different subsets of the documents on different computing devices or other above-describe computational entities. Thus, some embodiments may search the documents for keywords pertaining to topics and designate documents responsive to keyword searches for those topics as pertaining to the corresponding topics.

In some embodiments, the designation may be made with the topic scores. In some cases, topics scores may be a Boolean value indicating whether a given document is determined to pertain to a respective topic. In some embodiments, the topic scores may be cardinal or ordinal values, such as integers, like an 8 or 16 bit integer value, that indicates a relative amount that a document pertains to the topic. For example, a topic score may be an integer value from 0 to 7, with values of 0 indicating no pertinence of the document to the topic, and values of 7 indicating a highest level of pertinence in the scoring system of the document to the topic. In some embodiments, the number of topics may include 2, 3, 5, 10, 50, 100, 500, 1000, or more topics, in some cases with each topic having a corresponding topic score for each document. In some embodiments, the topic scores may be implicit. For example, each document may be associated with a list of topic identifiers having greater than a threshold pertinence, thereby explicitly scoring that document with a Boolean value of true for each of the listed topics and an implicit Boolean value of false for each of the nonlisted topics.

In some embodiments, topics may be detected in the documents with trained machine learning models. Examples include the supervised and unsupervised techniques described below for learning topic models. These models may output for each document, for each topic, a respective topic score, which again in some cases may be compared to a threshold to output a binary topic score indicative of whether the respective document pertains to the respective topic. In some embodiments, each document may be characterized as having a topic vector, with dimensions of the vector corresponding to the topic scores. Data structures need not be labeled as vectors in program code to constitute vectors, provided they encode the corresponding information. Some embodiments may output from the operation of block 14 a data structure that associates each time stamped document with a corresponding respective topic vector.

Next, some embodiments may determine temporal-metrics of the topics based on timestamps of the documents, as indicated by block 16. In some embodiments, the temporal-metrics may be based on the topic scores. Some embodiments may select, for each topic, documents having greater than a threshold topics score corresponding to that topic and then calculate topic-specific metrics among the respective selected subset of documents. (This and other scoring systems described herein where an increase in a score represents an increase in some property may also be practiced by multiplying the scores by −1 and representing an increase in the property with a decrease in the score. Similarly, thresholds described as being exceeded under these systems may instead be practiced by detecting that values are less than a corresponding threshold where the score is multiplied by the −1.) In another example, some embodiments may not select subsets of the documents for topics and may calculate temporal-metrics on topic scores across all of the documents, for example, where some of the documents have a topic score of zero, none of which is to suggest that any other feature described herein may not also be omitted in some cases.

In some embodiments, the temporal-metrics may be calculated by aggregating documents over time (e.g., into groups over which group statistics are determined). For example, some embodiments may calculate a timeseries histogram where documents are binned by a day, week, month, or year, or some other periodic duration of time. A temporal-metrics value may be calculated for each bin based on topic scores of documents in the respective bin. Thus, some embodiments may produce a plurality of temporal-metric time series that each span a range of time. For example, a given temporal-metric, for a given topic, may be calculated for each day of the year, producing 365 instances of that temporal-metric, with some of those instances reflecting a plurality of documents published on a given day. In another example, documents may be placed into bins on a weekly basis and a value of each temporal-metric for each topic may be calculated based on the topic scores for each document published within each respective week, for instance, with 52 values over the course of a year for a given temporal-metric of a given topic. In another example, temporal-metrics may be calculated based on a moving aggregation of documents, like a moving measure of central tendency, such as a moving mean, median, or mode value of documents within a threshold range of time of a moving reference time. For example, some embodiments may calculate a moving average of documents within ±four days of every day in the year for each temporal-metric for each topic. Topic scores may be aggregated with a variety of techniques, including determining a measure of central tendency, a measure of variation (like a standard deviation, variance, or a range between a maximum and minimum), or a sum of the topic scores within some aggregate group of documents for a given topic.

Temporal-metrics may take a variety of different forms. Some embodiments may include each of the presently described examples or any permutation thereof, which is not to suggest that any other description is limiting. Some embodiments may determine a peak aggregate topic score, for instance, across one of the above-describe bins, moving aggregations, or concurrent collections thereof, like the topic events described below. For example, some embodiments may determine a root mean square value of the topic scores for a given topic over some aggregate group of documents like those described above. Some embodiments may determine a maximum value of the topic scores over some consecutive range of time, like a range of time spanning one of the topic events described below. Some embodiments may determine a persistence of the topics over time, for example, a frequency component of a Fourier transform of a timeseries of a given topic score of documents aggregated as described above, or a duration of consecutive time during which the given topic score exceeds a threshold, like during one of the below-described topic events. In some embodiments, temporal-metrics may correspond to different frequencies of a Fourier transform of one of these timeseries, with topic metrics corresponding to greater than a threshold frequency and other topic metrics corresponding to less than a threshold frequency or respective ranges of frequency. In some cases, temporal-metrics may correspond to other components of the time series, like parameters of a trendline (like slope and intercept), or phase, amplitude, and frequency of an oscillating component.

Some embodiments may cluster the documents over time based on the topic scores, e.g., into consecutive groups in which documents in the group satisfy some criteria. In some embodiments, clusters may correspond to topic events in which the topic is appearing in (e.g., deemed to pertain to) more than a threshold amount of documents within less than a threshold amount of time, for example, more than a threshold amount of documents per day, week, or other duration of time in which documents are aggregated in the manner described above. In some embodiments, topic events may be detected by determining when a temporal-metric for a given topic (such as a sum of topic scores per day or number of documents pertaining to that topic are published per day) exceeds a threshold and then when the temporal-metric falls below the threshold subsequently, with the duration of time therebetween defining a topic event. Some embodiments may detect a plurality of topic events and create a data structure in memory that maps an identifier of each topic event to the documents within the respective event. In some cases, a given document may pertain to multiple topic events for different topics. In some embodiments, topic events may be detected for each of the respective topics, and in some cases for each of the respective temporal-metrics. In some embodiments, a given topic may have a plurality of topic events occurring over time, for example, as various stories find prominence in the news or other media.

In some embodiments, the temporal-metrics are temporal-metrics of the topic events, such as a peak value for a given topic event, a measure of central tendency of a peak value for each of the topic events for a topic, or a measure of variance thereof. Other examples include persistence of topic events, such as a duration of time spanned by a given topic event, a measure of central tendency of duration of time spanned by each of the topic events for a given topic, or a measure of variation of durations of time spanned by topic events of a given topic. In some embodiments, the temporal-metrics are frequencies of the topic events for a given topic, such as a average number of topic events occurring over some larger aggregate duration of time, like an average number of topic events per month or year, or in some cases the temporal-metric is a rate of change or rate of acceleration of any of these values.

In some embodiments, some or all of these temporal-metrics may form a signature of respective topics based upon historical occurrences of those topics in the corpus. As described below, some embodiments may generate predictions of future occurrences of these topics based upon the signatures.

In some embodiments, the temporal-metrics pertain to subsets of the documents, for example documents within a given channel among those described above. In some embodiments, the temporal-metrics are based on interactions between various channels, topics, or combinations thereof, for example ratios of amounts of news articles on a respective pair of topics per day. In some embodiments, the topics are arranged in a hierarchical ontology of topics, with some topics being species of other more generic parent topics, and topic scores may be calculated for each topic in the ontology. Some embodiments may determine temporal-metrics similarly for each topic in the ontology. In some embodiments, the graphical user interface may include inputs by which a user may navigate up or down through the above-described hierarchical ontology of topics, selectively viewing temporal-metrics pertaining to more granular aspects of selected topics or collapsing such more granular views into views that provide aggregate temporal-metrics across several species of a given topic. In some embodiments, the temporal-metrics may include similar aggregate values based upon one or more of the above-describes metadata attributes of documents, such as an amount of shares of the documents or an amount of use of the documents, or an amount of comments on the documents. Temporal-metrics may also include other measurements taken from the documents, like sentiment, or attributes of other documents determined to be semantically similar.

Some embodiments may generate a graphical user interface depicting some or all of these temporal-metrics, as indicated by block 18. Examples of such graphical user interfaces are depicted in the provisional application incorporated by reference herein. In some embodiments, generating this or other graphical user interfaces described herein may include causing instructions to be sent to a client computing device that renders the graphical user interface, for example, in a web browser based upon webpage markup, styling, and scripting instructions sent from the computational linguistics system to the web browser.

In some embodiments, analysis of past events, such as topic events, may be performed to provide insights without make predictions like those described below, which is not to suggest that any other description is limiting. Some embodiments generate a summary of individual events, for instance a graphical representation of the metrics of that event. Some embodiments may generate a summary of a collection of events, e.g., each event for a topic, each event for a set of topics, each event for a set of sub-topics of a more general topic, or combinations thereof. In some cases, the summaries may include graphical user interfaces like those distributed in block 18. Examples include interfaces that map relationships between events to spatial dimensions in a display, like force directed graphs, bar graphs, trend lines, or the like. Some examples organize events spatially, e.g., into clusters of events arranged based on temporal proximity or similarity of topics or documents exhibiting those topics. Some embodiments map these or other visual attributes to icons representing topic events, topics, keywords, entities mentioned in documents, channels, or documents, or metrics or other attributes thereof, in the graphical user interface. Examples of such visual attributes include position, size, color, opacity, or properties in a physical model by which a graph is formed, like the force directed graphs described below. In some embodiments, the graphical user interface may include user selectable icons by which the graphical user interface may be transitioned to an interface like those described below for analyzing collections of documents, e.g., analyzing a collection of documents associated with a topic, entity, keyword, channel, event, or the like mapped to a selected icon.

Some embodiments may predict, based on the temporal-metrics, probabilities of topics reemerging in the future, as indicated by block 20. In some embodiments, the probabilities may be probabilities of topic events occurring in the future for respective topics, or in some embodiments, the topics may be deemed to have reemerged upon the topics having temporal-metrics satisfying some other criteria, for example, exceeding a different threshold number of publications pertaining to the topic per day, week, or month. In some embodiments, the probabilities may be based upon additional documents subsequent to those in the corpus obtained in the operations of block 12. In some embodiments, a prediction of a topic event may be a prediction of a duration of a topic event that has already begun and is indicated in the documents subsequent to those in the corpus. For example, some embodiments may determine that a topic event that is just beginning will have a duration equal to that of an average duration of previous topic events. In another example, some embodiments may predict that a topic event in a given topic has a given probability of occurring based upon a previous frequency of that topic event in the corpus. Some embodiments may determine the probabilities of the topics reemerging over a designated duration of time, and to this end, some embodiments may multiply that designated duration of time by the frequency to determine the probability.

Some embodiments may determine probabilities based upon temporal-metrics from metadata of documents or the other extracted measurements discussed above, for example a relatively high rate of sharing of documents pertaining to a given topic with a relatively low sentiment score may be indicative of a relatively high probability of an onset of a topic event of that topic. Some embodiments may determine probabilities based upon temporal-metrics of documents in a given channel. For example, temporal events may tend to begin in blog posts before finding larger audiences in news articles. Some embodiments may determine probabilities based upon combinations of these types of temporal-metrics, such as any permutation of the above-described temporal-metrics and channels.

Some embodiments may predict probabilities of topics reemerging in the future with a machine learning model trained on the corpus, for example, with a machine learning model trained on the temporal-metrics timeseries as determined in the operations of block 16. Various models for making predictions based upon multidimensional timeseries data may be implemented and used. Some embodiments may apply a regression to extrapolate from a trend of a temporal-metric into the future. Some embodiments may infer a periodic component of a temporal-metric or interaction therebetween and extract into the future based upon the periodic component and detected phase continuing, in some cases combining this with a trendline regression like that described above.

A variety of models may be used. Some embodiments may train a Long Short-Term Memory Recurrent Neural Network (LSTM RNN) model with backpropagation through time on data based on at least part of the corpus and then predicting whether topics will appear in future time-stamped documents with the trained LSTM RNN model. Some embodiments may determine a three-or-higher dimensional transition probability matrix of a three-or-higher order Hidden Markov Model on data based on at least part of the corpus with an implementation of the Baum-Welch algorithm and, then, predict whether the topics will appear in future time-stamped documents based on the transition probability matrix. Some embodiments may predict topic occurrences with a Bayesian structural time series (BSTS) model configured based on the corpus. Some embodiments may predict topics with a Multiple-Input, Multiple-Output (MIMO) model.

Some embodiments may apply a mixture of time series analysis and natural language processing, e.g., with a as neural network taking as inputs data from both types of inputs. Examples include a deep neural network having a component with a directed cycle of perceptrons paired with, e.g., feeding into, taking inputs from another acyclic component with a plurality of layers of perceptrons. Some embodiments may generated textual summaries of events or documents, e.g, a few (e.g., one, two, or more) human readable sentences. These summaries may be included in alerts sent to users, or the summaries may be displayed in the graphical user interfaces described herein. In some cases, the summaries may be generated based on rules, e.g., templates with placeholders for temporal-metrics and topic identifiers, in some cases with associated criteria for selecting the rule. In other cases, the textual summaries may be generated with Hidden Markov Models or Recurrent Neural Networks trained on a corpus of human-generated summaries and associated events/metrics/documents.

Some embodiments may generate a graphical user interface depicting the predicted probabilities, as indicated by block 22. Examples include those in the provisional application incorporated by reference. The graphical user interface may be formed with the techniques described above.

Some embodiments may automatically generate reports or alarms based upon the probabilities. For example, users may configure the computational linguistics system described below to automatically emit an alarm to a user-specified address in a user profile, like a text message to a phone number or email to an email address, responsive to a periodic determination of whether a probability for a designated topic occurring in the future exceeds a threshold. Some embodiments may send an alarm indicating that the topic is likely to reemerge within the coming day or week, for example, based upon an analysis of subsequently obtained documents that postdate those in the corpus. Some embodiments may generate these alarms, e.g., alerts, upon detecting that an event has happened, has completed, or has begun.

Some embodiments may store the probabilities in memory, as indicated by block 24. In some embodiments, the probabilities may be stored in association with an identifier of an analysis performed in an instance of the process 10.

Figure 2:
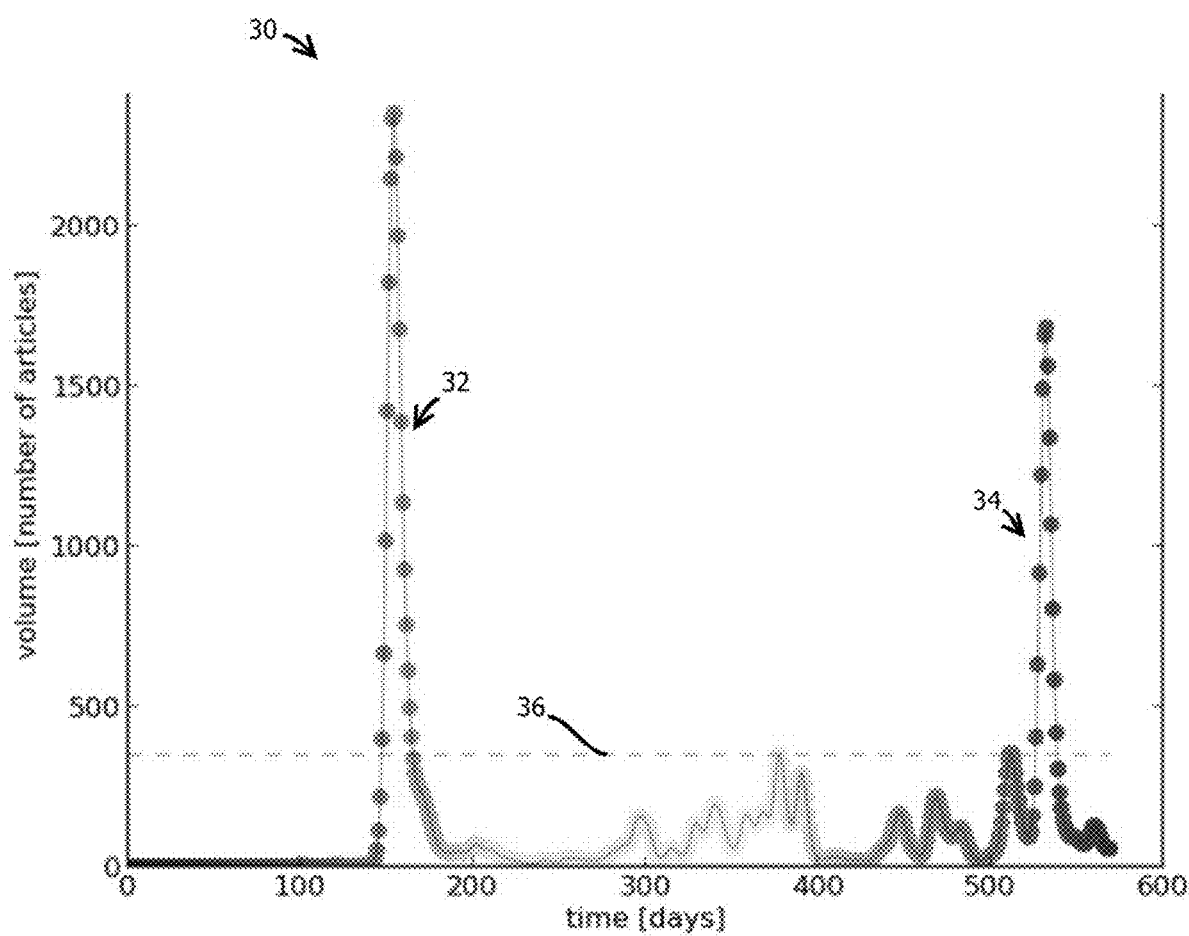
FIG. 2 is a timeseries graph of an example of a temporal-metric operated upon in the process of FIG. 1 in accordance with some embodiments of the present techniques.

FIG. 2 is a timeseries graph 30 depicting an example of a timeseries of a temporal-metric for a given topic. In this example, the temporal-metric is a number of articles pertaining to the given topic on a given day. Thus, in this example, documents are grouped in temporal bins corresponding to days, and the temporal-metric is a count of the number of documents deemed to pertain to the given topic. Examples of the topic may include a scandal for a given politician, a scientific development, a health issue, a policy dispute, a line of products, a flaw in a product, a feature of a product, a legal dispute, a product recall, an environmental issue, a natural disaster, a political dispute, or the like. As indicated, the temporal-metric, and corresponding publications pertaining to the topic, fluctuate over time. The illustrated timeseries depicts two topic events 32 and 34 in which the temporal-metric exceeds a threshold 36. These respective topic events may have their own temporal-metrics, for example, based upon the peak value in the timeseries and duration and frequency of the topic events.

Figure 3:
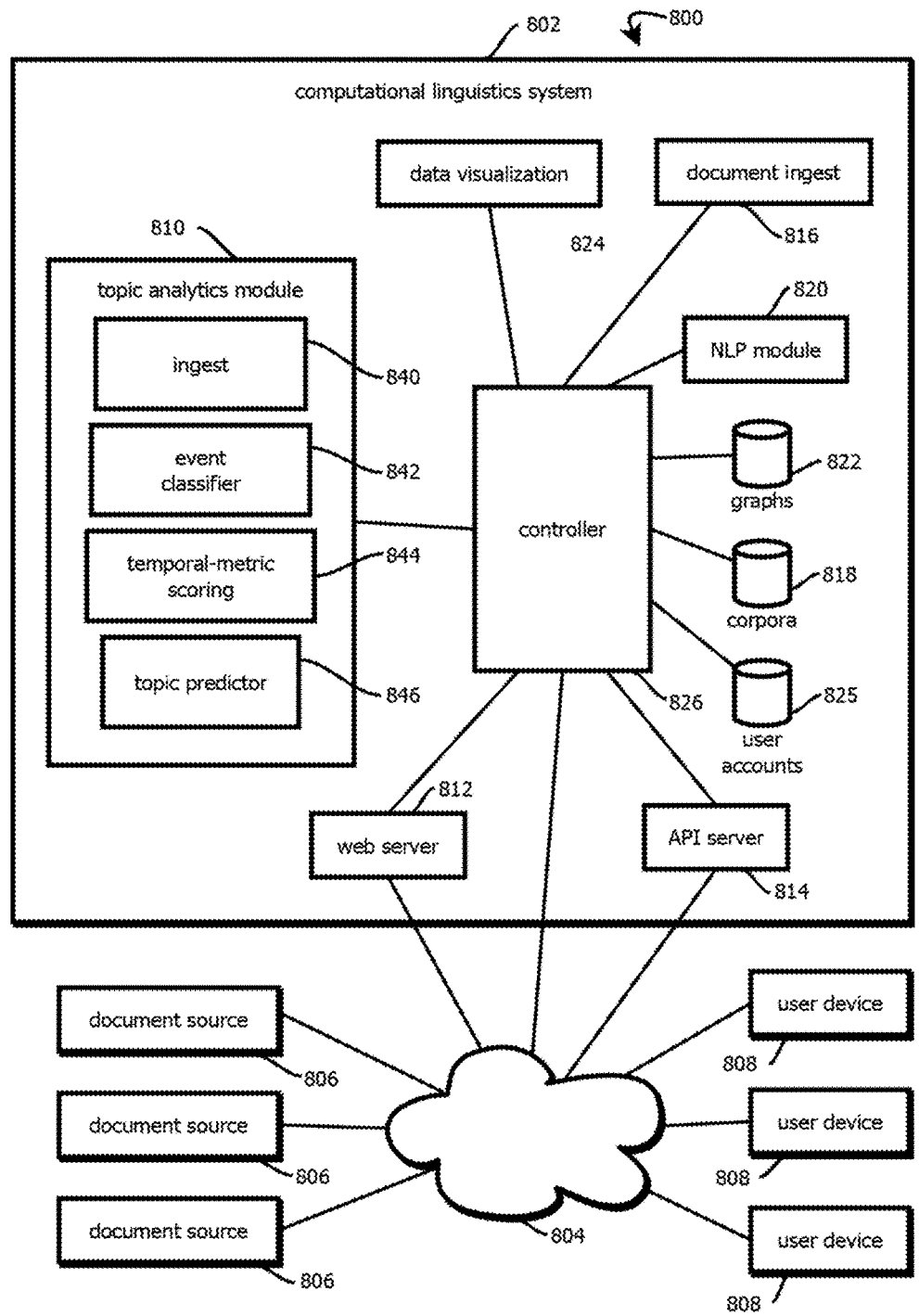
FIG. 3 is an example of a computational linguistics system in which the process of FIG. 1 may be implemented in accordance with some embodiments of the present techniques.

FIG. 3 illustrates, in block diagram form, the logical architecture of an example of a computing environment 800 in which the above-described techniques may be implemented. In some embodiments, many (and in some cases, most) queries and other analyses are expected to return information about relatively large collections of documents (e.g., more than 1,000, and in many cases, more than 10,000, or more than 100,000). This is the intended use case of some embodiments, which is distinct from many online search engines designed to designate the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit commands (like specifying corpora and topics) to the system 802 (which may be geographically remote) via a web browser executing on user devices 808 and exchanges over the Internet 804. In some embodiments, users may submit commands to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a topic analytics module 810 that may execute the process of FIG. 1 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the topic analytics module 810 includes an ingest module 840, an event classifier 842, a temporal-metric scoring module 844, and a topic predictor 846. In some embodiments, the ingest module 840 may access the above-described corpus, either in memory or by querying documents over a network, and determine the topic scores for the documents. In some embodiments, the event classifier 842 may detect topic events, for example, in the manner described above. In some embodiments, the temporal-metric scoring module 844 may determine some or all of the above-described temporal-metrics. In some embodiments, the topic predictor 846 may execute the operations described above by which future occurrences of topics in documents are predicted.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity web sites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpa of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

In some embodiments, a form of TF IDF may be calculated that suppresses the marginal effect of relatively high counts of n-grams within documents, for instance with a BM25 score. In some embodiments, the amount (e.g., count or frequency) of occurrences of the respective n-gram in a given document may occur both in a numerator and the denominator of a ratio with the amount of occurrences of the respective n-gram in the larger sample of other documents, for instance as a sum between these values in the denominator and the document-frequency in the numerator. In some embodiments, these values may have a derivative with respect to the amount of occurrences in the respective document that decreases in absolute value as the number of occurrences in the respective document increases, for instance monotonically or substantially monotonically. Thus, in some embodiments, the values may be proportionate or not proportionate to the amount of occurrences of the respective n-gram in the respective document. Suppressing the effect of higher occurrence amounts in the document at issue is expected to yield results closer to the user's intent, though embodiments are consistent with other (e.g., proportional) approaches.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

Some embodiments may learn a set of topics and n-grams pertaining to the respective topics, and label documents, collections of documents, and n-grams according to scores indicating a pertinence of the topic. In some embodiments, the number of topics may be relatively large, for example, more than 10 topics, and in many cases substantially more, like more than 50, more than 500, or more than 1,000 topics in relatively fine-grained analyses. In some embodiments, the topics may be arranged in a hierarchical taxonomy, for instance, with "health" at a top level, "heart health" and "lung health" at an intermediate level, and "heart attacks" and "hypertension" at a lower level of the former. In some embodiments, the topics may be labeled topics in the sense that each topic has a term that refers to the concept or set of concepts to which the topic pertains, like the topic name "health." In other embodiments, the topics are unlabeled, for instance, corresponding to a collection of concepts or a concept that are inferred to be distinct from other collections of concepts, but these concepts or collections of concepts may be unnamed (e.g., after topics are identified but before topics are labeled) beyond merely being recognized as distinct by some embodiments. For example, some unsupervised learning techniques may group or score keywords according to a specified number of topics, without labeling each of those topics.

In some embodiments, each topic may be associated with a set of n-grams, such as one, two, three, four or more consecutive words appearing in natural language text. For example, the phrase "quick brown fox jumped over the lazy dog" includes bi-grams of "quick brown," "brown fox," "fox jumped," and so on, as well as tri-grams like "quick brown fox," "brown fox jumped," and so on. Some embodiments may include n-grams up to some threshold, like 1 (for keywords), 2, 3, 4, or 5. In some embodiments, the n-grams may be obtained from the text of a set of documents for extracting topics. In some embodiments, the set of documents may be the corpus obtained, a subset of the corpus (e.g., a random sample deemed large enough to yield statistically significant results while expediting processing), an overlap with the corpus, or a different set of documents. In some embodiments, the n-grams may be each unique n-gram present in the set of documents, in some cases excluding stop words.

In some embodiments, each topic may have a topic-specific score associated with each of these n-grams, for instance, in the form of a topic vector, where dimensions of the vector corresponds to each of the topics, and where values of each of the dimensions indicate an amount by which the corresponding n-gram is predictive of the corresponding topic. For example, a topic vector for the topic of "basketball" may include a dimension corresponding to the n-gram of "backboard" and that n-gram's dimension in the vector may have a score of 0.95 indicating a relatively strong predictive value for inferring that the n-gram refers to the topic of "basketball." The same topic vector may include another dimension corresponding to the n-gram of "court," and the n-gram may have a score of 0.3, illustrating a much weaker predictive value, for instance, due to this n-gram being used in association with many other topics, like a court of law. Similarly, the same set of topics may include the topic of "law," and the n-gram of "court" may have a score for this topic that is higher, for instance 0.6, indicating that the conditional probability of "law" being exhibited when the n-gram of "court" is observed is higher than the conditional probability of "basketball" being exhibited when the same n-gram is observed.

Encoding the topic-specific scores of the n-grams in the form of a topic vector is expected to consume less memory than systems that explicitly record key-value pairs for each topic and each n-gram and reduce the amount of data shifted up and down a memory hierarchy in a computer system or between computer systems, thereby yielding faster computations, though embodiments are also consistent with these slower approaches. Some embodiments may encode the topic vectors as tuples. In some cases these scores, and the other scores described herein, may be encoded as binary values of some length selected based on a specification of an operating system or a central processing unit (CPU), such as an 8-bit value, a 32-bit value, or a 64-bit value, each corresponding to, for instance, an address space size of an operating system, a number of registers in a CPU, or a unit of memory that moves as a block between one level of memory hierarchy and another.

In some embodiments, to conserve memory, the set of n-grams associated with each topic may be pruned. For example, in some cases, n-grams having a topic-specific score that does not satisfy a threshold, for instance, is less than a threshold value (e.g., 0.7), may be omitted from the set of n-grams corresponding to the respective topic. In some cases, the correspondence of n-grams after pruning to topics may be indicated with a binary value of zero or one in a topic vector, with dimensions that satisfy the threshold being designated with a 1 and dimensions that do not being designated by a 0. In some cases these topic vectors are expected to be relatively sparse, and some of the techniques described below for expediting computing operations with sparse vectors may be employed to expedite computations.

In some cases, the topics, the set of n-grams, and the scores for those n-grams may be explicitly provided as an input, for instance, by a user configuring the system with hand-coded topic data. However, in many cases, users are seeking document relationship graphs because the users are seeking an understanding of a relatively large corpus and the topics therein. In many of these use cases, the user will not have on hand a defined topic set, nor will it be feasible for a user to accurately specify a topic set well calibrated for interrogating the corpus of documents.

In some embodiments, the set of topics, the set of n-grams corresponding to those topics, and topic specific scores for each of those n-grams may be inferred from a set of documents, like the corpus itself, a set with overlap with the corpus, or a different set of documents. In some cases, supervised learning may yield such a data set. For example, in some embodiments, a user may supply a training set of documents in which the documents have been labeled with the topics exhibited by the respective documents. In some embodiments, the labeling is relatively granular, with multiple topics appearing in the documents, and subsets of the documents labeled as pertaining to particular topics. For example, such labels may indicate a range of words in the document by word count, for instance, with a start word count and an end word count, and this range may be associated with an identifier of a topic and a score indicating a pertinence of the topic to the range of text (e.g., from 0 to 1). In other cases, the labeling may be less granular, and a single topic label may be applied to an entire document, or a collection of topic labels may be applied to an entire document, in some cases with a binary indication, or in other cases with a cardinal score indicating a pertinence of the respective topics to the respective document.

Based on this training set, for each topic, some embodiments may learn topic-specific scores for each n-gram, the scores indicating an amount that the corresponding n-gram predicts the corresponding topic. A variety of different techniques may be used to learn these topic-specific scores. In some embodiments, the result of learning may be a topic model (e.g., a mapping of topics to a set of n-grams, each n-gram having a topic-specific score indicating a conditional probability of the respective topic being exhibited upon observing the respective n-gram in a document) having parameters that indicate the topic-specific scores. In some embodiments, the topic model may be formed by arbitrarily assigning topic-specific scores to the n-grams, for instance by randomly, like pseudo-randomly, assigning such scores. Next, some embodiments may iteratively determine whether the model parameters agree with the labels in the training set and adjust the model parameters to increase an amount of agreement (or determine whether the model parameters disagree and adjust the model parameters to reduce an amount of disagreement). In some cases, these iterations may continue until an amount of change between iterations is less than a threshold or a threshold number of iterations have occurred. For instance, some embodiments may adjust the model parameters according to a stochastic gradient descent. In some embodiments, the topic-specific scores are determined with supervise learning, based on the training set, with a support vector machine. In some embodiments, the topic-specific scores are determined with supervise learning, based on the training set, with a Bayesian topic model.

In some embodiments, the topic-specific scores may be determined with unsupervised learning. In some cases, it can be relatively expensive and time-consuming to obtain the training set, or the available training sets may not be known to have the appropriate type of subject matter to yield topics relevant to the corpus at issue. In such scenarios, unsupervised learning may yield the set of topics, n-grams pertaining to the topics, and corresponding topic-specific scores without requiring a training set be provided.

Some embodiments may ascertain topics in documents, sets of n-grams (e.g., keywords, or bi-grams or tri-grams) pertaining to each topic, a score for each n-gram for each topic indicating how predictive the respective n-gram is of the topic, and an score for each topic for each document indicating an amount the topic is exhibited by the document. Some embodiments may perform this analysis with an unsupervised learning technique, e.g., without incurring the cost of obtaining a manually labeled training set of documents where humans tag text as pertaining to topics or supply topic-n-gram correspondence values.

For instance, some embodiments may execute a form of Latent Dirichlet Allocation. In some cases, a number of topics to be ascertained may be supplied, e.g., by a user indicating that 2, 3, 5, or 50 topics are to be ascertained. Next, some embodiments may arbitrarily (e.g., randomly, like pseudo-randomly) designate each n-gram in each document as pertaining to one of the topics. Then, some embodiments may iteratively adjust the designations to make n-grams that, within the set of documents, tend to co-occur in a document more likely to be designated with the same topic.

For example, some embodiments may, for each document, for each n-gram in the respective document, for each topic, determine 1) an amount (e.g., proportion relative to a total number of n-grams of the same length) of n-grams in the respective document designated as pertaining to the respective topic, and 2) an amount (e.g., proportion relative to all documents) of all instances of n-grams (e.g., of the same length as the respective n-gram) in all of the documents designating as pertaining to the respective topic. And then for the respective document and n-gram, some embodiments re-designate the respective n-gram as pertaining to a topic selected according to a probability of the topics.

The probability of the topics may be 1) the conditional probability of the respective topic being exhibited given the respective document multiplied by 2) the conditional probability of the respective n-gram occurring given that the respective topic is exhibited (as indicated by the current distribution of assignments). In some embodiments, this operation may be repeated until the designations converge, e.g., until less than a threshold amount of designations change, or a sum or measure of central tendency of the second conditional probability changes by less than a threshold amount, or until a threshold number of iterations have occurred.

In some embodiments, for larger document sets, or larger documents, the operations may be relatively computationally complex and resource intensive. Accordingly, some embodiments may perform the analysis in a distributed computing framework, like Apache Hadoop- or Spark, e.g., with documents or portions of documents being assigned to different nodes (e.g., computing devices or threads), and each node determining document-specific values (e.g., counts of n-grams or topic-pertinence, etc.), before the document-specific values are aggregated, e.g., to determine conditional probabilities for a population of documents. In some cases, some tasks may be assigned to nodes by document (e.g., sending each node a subset of documents), while other tasks may be assigned to nodes by topic (e.g., sending each node a subset of topics). In some cases, the number of nodes may be relatively large, e.g., exceeding 10, or 100 nodes. Sending instructions to the distributed data, rather than moving data between computing devices where instructions are static, is expected to yield faster results for particularly large data sets. Or some embodiments may perform these operations in a single thread or a single computing device.

Some embodiments may account for changes in topic associations with n-grams over time. In some cases, a plurality of sets of n-grams pertaining to a given topic may be determined, with each instance in the plurality being determined based on a different set of documents, each set of documents being associated with a duration of time, such as continuous ranges of time, like by year. In some cases, a user may select a particular time range for a particular topic or set of topics, and the corresponding time-range specific topic vectors may be selected for subsequent processing.

Some embodiments may learn multiple sets of topics, with each instance corresponding to a different granularity of topics. For instance, some embodiments may execute one of the above-described unsupervised techniques for learning a topic model with a first number of topics, like five, to yield a first set of topics and n-grams pertaining to the respective topics, and then execute the same technique with a different number of topics, like 50, to yield a second set of topics and n-grams pertaining to those respective topics, with greater granularity. Some embodiments may provide a user interface by which a user may select a granularity before selecting a topic, and corresponding topic vectors may be determined in response to the user selection.

In some embodiments, whether the topics and associated values are obtained with supervise learning, unsupervised learning, or explicitly provided, each topic may be specified by a topic vector, and the collection of topic vectors may form a topic matrix, with one dimension corresponding to topics (e.g., columns of the matrix), another dimension corresponding to n-grams (e.g., rows of the matrix, or vice versa). In some embodiments, the topic-specific scores may be normalized across topics. For instance, some n-grams may be relatively common generally and have a high correspondence with each of the topics, in which case, some embodiments may reduce an amount by which the corresponding n-grams are indicated to predict the topics relative to n-grams that have relatively isolated correspondence to relatively few topics. In some cases, such normalization may emerge in the process of learning topic-specific scores, or some embodiments may impose such normalization, for instance, by dividing each topic-specific score for each n-gram with the sum of topic-specific scores for the respective n-gram across all of the topics. In some cases, visualizations may reflect topics associated with corresponding elements.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 4:
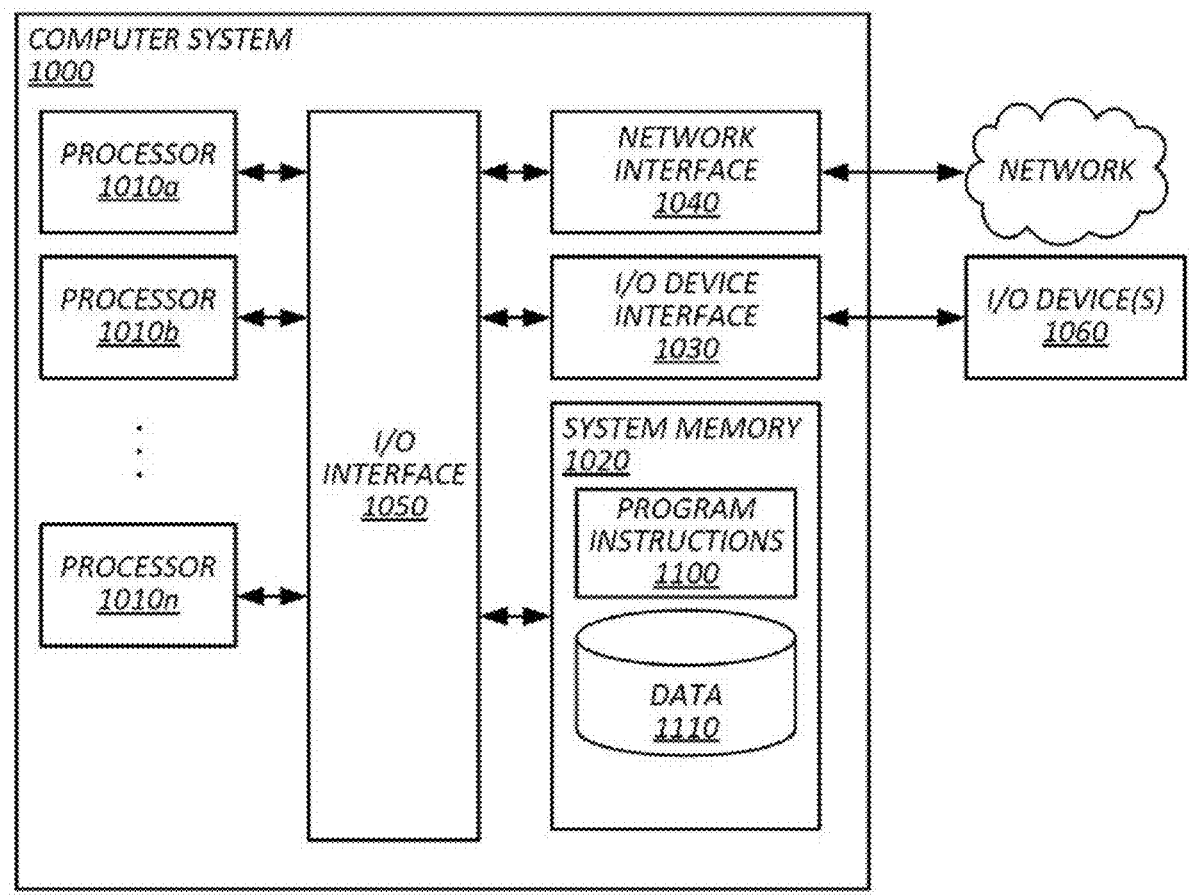
FIG. 4 illustrates an example of a computer system by which the above techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: obtaining, with one or more processors, a corpus having a plurality of time-stamped documents having unstructured natural language text; detecting, with one or more processors, topics in the unstructured natural language text and, in response, associating with each of the documents one or more topic scores by which the topics are detected, wherein: detecting topics comprises determining the topic scores; the topic scores are indicative of whether an associated document in the corpus pertains to a topic corresponding to the respective topic score; detecting topics comprises detecting whether the documents pertain to any of a plurality of topics such that a determination is made for each permutation of topic-and-document pair; determining, with one or more processors, temporal-metrics of the topics based on time-stamps of documents to which the topics pertain, wherein: determining temporal-metrics comprises aggregating topic scores over time according to the time-stamps of the documents to form aggregated topic scores; determining temporal-metrics comprises determining a measure of a peak aggregated topic score for at least some of the topics; and determining temporal-metrics comprises determining a measure of persistence for at least some of the topics; predicting, with one or more processors, based on the temporal-metrics, whether a given topic among the plurality of topics will appear in future time-stamped documents having unstructured natural language text; and storing, with one or more processors, a result of the prediction in memory.

2. The medium of embodiment 1, wherein: the obtained corpus comprises more than 2,000 documents; the documents include, on average, more than 50 words in the unstructured natural language text; time-stamps of the documents span a duration of time exceeding one month; detecting topics comprises detecting whether the documents pertain to any of more than 5 topics; at least some documents in the corpus are determined to pertain to two or more of the topics; and predicting comprises determining respective probabilities of each of the plurality of topics appearing in future time-stamped documents having unstructured natural language text.

3. The medium of any one of embodiments 1-2, wherein the corpus comprises: news articles, blog posts, and social media posts.

4. The medium of any one of embodiments 1-3, wherein detecting topics comprises: accessing a set of keywords, wherein respective subsets of the set of keywords corresponding to different respective topics among the plurality of topics; searching the unstructured natural language text for the keywords; and scoring the documents with topic scores based on whether respective documents are responsive to search queries for keywords corresponding to respective topics to which respective topic scores pertain.

5. The medium of embodiment 4, wherein scoring comprises: determining a first frequency with which a given keyword appears in a given document; determining a second frequency with which the given keyword appears in a corpus of documents; determining a value based on a ratio of the first frequency and the second frequency.

6. The medium of any one of embodiments 1-5, wherein: detecting topics comprises detecting topics with a trained topic model; the operations comprise training the topic model with operations comprising: obtaining a training set of documents; for each document in the training set, for each n-gram in each respective document of the training set: for each topic of a plurality of topics, determining: an amount of n-grams in the respective document designated as pertaining to the respective topic; and an amount of all instances of n-grams of a specified size in all of the documents of the training set designated as pertaining to the respective topic; for the respective document and n-gram in the training set, designating the respective n-gram as pertaining to a topic selected according to probabilities of the topics based on the determined amounts; the amount of n-grams in the respective document designated as pertaining to the respective topic is a proportion relative to a total number of n-grams of the same length as the respective n-gram in the respective document; the amount of all instances of n-grams in all of the documents of the training set designated as pertaining to the respective topic is a proportion relative to all documents in the training set; the specified size is a same size as a length in words of the respective n-gram; and probabilities of the topics based on the determined amounts are based on a conditional probability of a respective topic being exhibited given a respective document multiplied by a conditional probability of the respective n-gram occurring given that the respective topic is exhibited.

7. The medium of any one of embodiments 1-5, wherein: detecting topics comprises detecting topics with a trained topic model; and the operations comprise training the topic model with operations comprising: obtaining a labeled training set of documents, the labeled training set of documents being the same, overlapping, or different from the corpus, the labeled training set of documents including unstructured text labeled with respective topics to which the respective text pertains; obtaining n-grams occurring in the set of documents; and determining the sets of n-grams pertaining to the respective topics by performing operations comprising: designating n-grams occurring in the set of documents as pertaining to topics with respective topic-specific scores; and iteratively determining an amount of agreement or disagreement between the topic-specific scores and the labels in the training set and adjusting the topic-specific scores in response to increase the amount of agreement or decrease the amount of disagreement.

8. The medium of any one of embodiments 1-7, wherein determining temporal-metrics of the topics comprises: binning the documents into temporal bins corresponding to a periodic duration of time; and determining, for a given temporal-metric, respective values of the given temporal-metric for documents in respective temporal bins.

9. The medium of any one of embodiments 1-8, wherein determining temporal-metrics of the topics comprises: determining temporal-metrics based on a moving measure of central tendency of a metric based on documents with a time-stamp within a threshold duration of time of a corresponding moving time.

10. The medium of any one of embodiments 1-9, wherein determining temporal-metrics of the topics comprises: selecting a subset of the documents pertaining to the given topic; temporally clustering the subset of documents into a plurality of events, each event comprising a different plurality of documents in the subset and characterizing a respective fluctuation in occurrence of the given topic; and determining event-metrics of the topic events, the event metrics including: a first value indicative of frequency of the events; a second value indicative of a measure of central tendency of duration of the respective events; a third value indicative of a measure of variation of duration of the respective events; a fourth value indicative of a measure of central tendency of peak amounts of occurrences in the documents for the given topic for respective events; and a fifth value indicative of a measure of variation of peak amounts of occurrences in the documents for the given topic for respective events.

11. The medium of embodiment 10, wherein predicting whether the given topic among the plurality of topics will appear in future time-stamped documents comprises: predicting a probability of another topic event for the given topic based on the event metrics, the topic events each encompassing more than a threshold amount of documents or aggregate topic scores.

12. The medium of any one of embodiments 1-11, wherein predicting whether the given topic among the plurality of topics will appear in future time-stamped documents comprises: accessing a timeline signature of the given topic that is based on temporal-metrics of the given topic; and predicting whether the given topic is likely to be exhibited in a topic event in a designated duration of time in the future based on the timeline signature of the given topic.

13. The medium of any one of embodiments 1-11, wherein: the operations comprise training a Long Short-Term Memory Recurrent Neural Network (LSTM RNN) model with backpropagation through time on data based on at least part of the corpus; and predicting whether the given topic among the plurality of topics will appear in future time-stamped documents comprises predicting with the trained LSTM RNN model.

14. The medium of any one of embodiments 1-11, wherein: the operations comprise determining a three-or-higher dimensional transition probability matrix of a three-or-higher order Hidden Markov Model on data based on at least part of the corpus with an implementation of the Baum-Welch algorithm; and predicting whether the given topic among the plurality of topics will appear in future time-stamped documents comprises predicting based on the transition probability matrix.

15. The medium of any one of embodiments 1-11, wherein predicting whether the given topic among the plurality of topics will appear in future time-stamped documents comprises: predicting with a Bayesian structural time series (BSTS) model.

16. The medium of any one of embodiments 1-15, wherein the operations comprise: generating instructions by which a graphical user interface is formed on a user computing device, the graphical user interface graphically depicting at least some of the temporal-metrics of the topics; and causing the instructions to be sent to the user computing device.

17. The medium of any one of embodiments 1-16, wherein the operations comprise: accessing a user profile comprising: a network-accessible address; an identifier of the given topic; determining that a probability of the given topic appearing in more than a threshold amount of future time-stamped documents exceeds a probability threshold; and in response to the determination, causing a message indicative of the determination to be sent to the network-accessible address.

18. The medium of any one of embodiments 1-17, the operations comprising: providing a computational linguistics system configured to analyze semantic similarity among the documents in the corpus.

19. A method comprising: the operations of any one of embodiments 1-18.

20. A system, comprising: one or more processors; and memory storing instructions that when executed by the processors cause the processors to effectuate operations comprising: the operations of any one of embodiments 1-18.

What is claimed is:

1. A tangible, non-transitory, machine-readable medium storing instructions that when executed by one or more processors effectuate operations comprising:
    obtaining, with one or more processors, a corpus having a plurality of time-stamped documents having unstructured natural language text;
    detecting, with one or more processors, topics in the unstructured natural language text and, in response, associating with each of the documents one or more topic scores by which the topics are detected, wherein:
        detecting topics comprises determining the topic scores;
        the topic scores are indicative of whether an associated document in the corpus pertains to a topic corresponding to the respective topic score;
        detecting topics comprises detecting whether the documents pertain to any of a plurality of topics such that a determination is made for each permutation of topic-and-document pair;
    determining, with one or more processors, temporal-metrics of the topics based on time-stamps of documents to which the topics pertain, wherein:
        determining temporal-metrics comprises aggregating topic scores over time according to the time-stamps of the documents to form aggregated topic scores;
        determining temporal-metrics comprises determining a measure of a peak aggregated topic score for at least some of the topics;
        determining temporal-metrics comprises determining a measure of persistence for at least some of the topics; and
        determining temporal-metrics for at least one given topic comprises:

selecting a subset of the documents pertaining to the given topic, temporally clustering the subset of documents into a plurality of events, each event comprising a different plurality of documents in the subset and characterizing a respective fluctuation in occurrence of the given topic, and determining event-metrics of the topic events;

predicting, with one or more processors, based on the temporal-metrics, whether the given topic among the plurality of topics will appear in future time-stamped documents having unstructured natural language text, wherein the predicting based on the temporal-metrics comprises predicting a probability of another topic event for the given topic based on the event metrics, the topic events each encompassing more than a threshold amount of documents or aggregate topic scores; and storing, with one or more processors, a result of the prediction in memory.

2. The medium of claim 1, wherein:

the obtained corpus comprises more than 2,000 documents;

the documents include, on average, more than 50 words in the unstructured natural language text;

time-stamps of the documents span a duration of time exceeding one month;

detecting topics comprises detecting whether the documents pertain to any of more than 5 topics;

at least some documents in the corpus are determined to pertain to two or more of the topics; and predicting comprises determining respective probabilities of each of the plurality of topics appearing in future time-stamped documents having unstructured natural language text.

3. The medium of claim 1, wherein the corpus comprises:

news articles, blog posts, and social media posts.

4. The medium of claim 1, wherein detecting topics comprises:

accessing a set of keywords, wherein respective subsets of the set of keywords corresponding to different respective topics among the plurality of topics;

searching the unstructured natural language text for the keywords; and scoring the documents with topic scores based on whether respective documents are responsive to search queries for keywords corresponding to respective topics to which respective topic scores pertain.

5. The medium of claim 4, wherein scoring comprises:

determining a first frequency with which a given keyword appears in a given document;

determining a second frequency with which the given keyword appears in a corpus of documents;

determining a value based on a ratio of the first frequency and the second frequency.

6. The medium of claim 1, wherein:

detecting topics comprises detecting topics with a trained topic model;

the operations comprise training the topic model with operations comprising:

obtaining a training set of documents;

for each document in the training set, for each n-gram in each respective document of the training set:

for each topic of a plurality of topics, determining:

an amount of n-grams in the respective document designated as pertaining to the respective topic; and an amount of all instances of n-grams of a specified size in all of the documents of the training set designated as pertaining to the respective topic;

for the respective document and n-gram in the training set, designating the respective n-gram as pertaining to a topic selected according to probabilities of the topics based on the determined amounts;

the amount of n-grams in the respective document designated as pertaining to the respective topic is a proportion relative to a total number of n-grams of the same length as the respective n-gram in the respective document;

the amount of all instances of n-grams in all of the documents of the training set designated as pertaining to the respective topic is a proportion relative to all documents in the training set;

the specified size is a same size as a length in words of the respective n-gram; and probabilities of the topics based on the determined amounts are based on a conditional probability of a respective topic being exhibited given a respective document multiplied by a conditional probability of the respective n-gram occurring given that the respective topic is exhibited.

7. The medium of claim 1, wherein:

detecting topics comprises detecting topics with a trained topic model; and the operations comprise training the topic model with operations comprising:

obtaining a labeled training set of documents, the labeled training set of documents being the same, overlapping, or different from the corpus, the labeled training set of documents including unstructured text labeled with respective topics to which the respective text pertains;

obtaining n-grams occurring in the set of documents; and determining the sets of n-grams pertaining to the respective topics by performing operations comprising:

designating n-grams occurring in the set of documents as pertaining to topics with respective topic-specific scores; and iteratively determining an amount of agreement or disagreement between the topic-specific scores and the labels in the training set and adjusting the topic-specific scores in response to increase the amount of agreement or decrease the amount of disagreement.

8. The medium of claim 1, wherein determining temporal-metrics of the topics comprises:

binning the documents into temporal bins corresponding to a periodic duration of time; and determining, for a given temporal-metric, respective values of the given temporal-metric for documents in respective temporal bins.

9. The medium of claim 1, wherein determining temporal-metrics of the topics comprises:

determining temporal-metrics based on a moving measure of central tendency of a metric based on documents with a time-stamp within a threshold duration of time of a corresponding moving time.

37

10. The medium of claim 1, wherein the event metrics include:
  a first value indicative of frequency of the events;
  a second value indicative of a measure of central tendency of duration of the respective events;
  a third value indicative of a measure of variation of duration of the respective events;
  a fourth value indicative of a measure of central tendency of peak amounts of occurrences in the documents for the given topic for respective events; and
  a fifth value indicative of a measure of variation of peak amounts of occurrences in the documents for the given topic for respective events.

11. The medium of claim 1, wherein predicting whether the given topic among the plurality of topics will appear in future time-stamped documents comprises:
  accessing a timeline signature of the given topic that is based on temporal-metrics of the given topic; and
  predicting whether the given topic is likely to be exhibited in a topic event in a designated duration of time in the future based on the timeline signature of the given topic.

12. The medium of claim 1, wherein:
  the operations comprise training a Long Short-Term Memory Recurrent Neural Network (LSTM RNN) model with backpropagation through time on data based on at least part of the corpus; and
  predicting whether the given topic among the plurality of topics will appear in future time-stamped documents comprises predicting with the trained LSTM RNN model.

13. The medium of claim 1, wherein:
  the operations comprise determining a three-or-higher dimensional transition probability matrix of a three-or-higher order Hidden Markov Model on data based on at least part of the corpus with an implementation of the Baum-Welch algorithm; and
  predicting whether the given topic among the plurality of topics will appear in future time-stamped documents comprises predicting based on the transition probability matrix.

14. The medium of claim 1, wherein predicting whether the given topic among the plurality of topics will appear in future time-stamped documents comprises:
  predicting with a Bayesian structural time series (BSTS) model.

15. The medium of claim 1, wherein the operations comprise:
  generating instructions by which a graphical user interface is formed on a user computing device, the graphical user interface graphically depicting at least some of the temporal-metrics of the topics; and
  causing the instructions to be sent to the user computing device.

16. The medium of claim 1, wherein the operations comprise:
  accessing a user profile comprising:
    a network-accessible address;
    an identifier of the given topic;
  determining that a probability of the given topic appearing in more than a threshold amount of future time-stamped documents exceeds a probability threshold or that an event has happened; and

38 in response to the determination, causing a message indicative of the determination to be sent to the network-accessible address.

17. The medium of claim 1, wherein:
  detecting topics comprises steps for detecting topics;
  determining temporal-metrics comprises steps for determining temporal-metrics; and
  predicting whether the given topic will appear comprises steps for predicting whether topics will appear in future documents based on historical documents.

18. The medium of claim 1, the operations comprising:
  providing a computational linguistics system configured to analyze semantic similarity among the documents in the corpus.

19. A method, comprising:
  obtaining, with one or more processors, a corpus having a plurality of time-stamped documents having unstructured natural language text;
  detecting, with one or more processors, topics in the unstructured natural language text and, in response, associating with each of the documents one or more topic scores by which the topics are detected, wherein:
    detecting topics comprises determining the topic scores;
    the topic scores are indicative of whether an associated document in the corpus pertains to a topic corresponding to the respective topic score;
    detecting topics comprises detecting whether the documents pertain to any of a plurality of topics such that a determination is made for each permutation of topic-and-document pair;
  determining, with one or more processors, temporal-metrics of the topics based on time-stamps of documents to which the topics pertain, wherein:
    determining temporal-metrics comprises aggregating topic scores over time according to the time-stamps of the documents to form aggregated topic scores;
    determining temporal-metrics comprises determining a measure of a peak aggregated topic score for at least some of the topics;
    determining temporal-metrics comprises determining a measure of persistence for at least some of the topics; and
    determining temporal-metrics for at least one given topic comprises:
      selecting a subset of the documents pertaining to the given topic,
      temporally clustering the subset of documents into a plurality of events, each event comprising a different plurality of documents in the subset and characterizing a respective fluctuation in occurrence of the given topic, and
      determining event-metrics of the topic events;
  predicting, with one or more processors, based on the temporal-metrics, whether the given topic among the plurality of topics will appear in future time-stamped documents having unstructured natural language text, wherein the predicting based on the temporal-metrics comprises predicting a probability of another topic event for the given topic based on the event metrics, the topic events each encompassing more than a threshold amount of documents or aggregate topic scores; and
  storing, with one or more processors, a result of the prediction in memory.

* * * * *